US007486415B2

(12) United States Patent
Kwak et al.

(10) Patent No.: US 7,486,415 B2
(45) Date of Patent: Feb. 3, 2009

(54) APPARATUS AND METHOD FOR RENDERING IMAGE, AND COMPUTER-READABLE RECORDING MEDIA FOR STORING COMPUTER PROGRAM CONTROLLING THE APPARATUS

(75) Inventors: Youngshin Kwak, Suwon-si (KR); Peter Bodrogi, Veszprem (HU); Heuikeun Choh, Seoul (KR); Gabor Kutas, Szekesfehervar (HU); Janos Schanda, Budapest (HU)

(73) Assignee: Samsung Electronics Co., Ltd., Suwon-si (KR)

( * ) Notice: Subject to any disclaimer, the term of this patent is extended or adjusted under 35 U.S.C. 154(b) by 845 days.

(21) Appl. No.: 11/100,416

(22) Filed: Apr. 7, 2005

(65) Prior Publication Data

US 2006/0017745 A1 Jan. 26, 2006

(30) Foreign Application Priority Data

Jul. 23, 2004 (KR) ...................... 10-2004-0057817

(51) Int. Cl.
*G06K 1/00* (2006.01)
*G06F 15/00* (2006.01)
*H04N 1/60* (2006.01)
*G06K 15/02* (2006.01)

(52) U.S. Cl. ........................................ 358/1.9; 358/1.2

(58) Field of Classification Search .................. 358/1.9, 358/1.1, 1.2, 1.6, 1.18, 528, 536
See application file for complete search history.

(56) References Cited

U.S. PATENT DOCUMENTS 6,075,926 A * 6/2000 Atkins et al. ................. 358/1.2
6,188,385 B1 2/2001 Hill et al.
6,522,425 B2 * 2/2003 Yoshidome ................. 358/1.9

FOREIGN PATENT DOCUMENTS

KR 2003-43496 6/2003

OTHER PUBLICATIONS

Translation of Office Action issued in Korean Patent Application No. 2004-57817 on Dec. 30, 2005.

* cited by examiner

*Primary Examiner*—Douglas Q Tran
(74) *Attorney, Agent, or Firm*—Stein, McEwen & Bui, LLP

(57) ABSTRACT

An image rendering apparatus and method, and a computer-readable recording medium for storing a computer program controlling the apparatus, the image rendering apparatus including: a tristimulus value converter converting pixel values of each of the input pixels included in an input image with a desired resolution to converted tristimulus values and outputting the converted tristimulus values of the input pixels; a tristimulus value generator generating generated tristimulus values of each of the output pixels each with a predetermined area in an output image using the converted tristimulus values of each of the input pixels received from the tristimulus value converter; and a pixel value generator converting the generated tristimulus values of each of the output pixels received from the tristimulus value generator to digital pixel values and outputting the converted digital pixel values.

25 Claims, 5 Drawing Sheets

APPARATUS AND METHOD FOR RENDERING IMAGE, AND COMPUTER-READABLE RECORDING MEDIA FOR STORING COMPUTER PROGRAM CONTROLLING THE APPARATUS

CROSS-REFERENCE TO RELATED APPLICATION

This application claims the priority of Korean Patent Application No. 2004-57817, filed on Jul. 23, 2004 in the Korean Intellectual Property Office, the disclosure of which is incorporated herein by reference.

BACKGROUND OF THE INVENTION

1. Field of the Invention

The present invention relates to an image processing apparatus and method, and more particularly, to an image rendering apparatus and method, and a computer-readable recording medium for storing a computer program controlling the apparatus.

2. Description of the Related Art

Subpixel rendering techniques have increased visual resolution of rendered images. Along with the development of the subpixel rendering techniques, image display apparatuses have displayed images using various forms of subpixels and the forms of subpixels have been developing more diversely enhancing image resolution.

Conventionally in most methods for rendering input images to generate output images, the forms of the subpixels are changed without considering how to match the subpixels of the input images to the subpixels of the output images. Meanwhile, a conventional method for improving image quality by rendering subpixels instead of changing the forms of the subpixels is disclosed in U.S. Pat. No. 6,188,385. However, the disclosed conventional method can be applied only to subpixels with a strip form.

SUMMARY OF THE INVENTION

According to an aspect of the present invention, there is provided an image rendering apparatus and method capable of rendering images regardless of geometrical forms of subpixels.

According to an aspect of the present invention, there is also provided a computer-readable recording medium for storing a computer program controlling an image rendering apparatus capable of rendering images regardless of geometrical forms of subpixels.

According to an aspect of the present invention, there is provided an image rendering apparatus including a tristimulus value converter converting pixel values of each of input pixels included in an input image with a desired resolution to tristimulus values and outputting the converted tristimulus values of the input pixels; a tristimulus value generator generating tristimulus values of each of the output pixels with a predetermined area in an output image, using the tristimulus values of each of the input pixels received from the tristimulus value converter, and outputting the generated tristimulus values of the output pixels; and a pixel value generator converting the tristimulus values of each of the output pixels received from the tristimulus value generator to digital pixel values and outputting the converted digital pixel values.

According to another aspect of the present invention, there is provided an image rendering method including converting pixel values of input pixels included in an input image with a desired resolution to tristimulus values; obtaining tristimulus values of each of the output pixels with a predetermined area in an output image; and converting the tristimulus values of the output pixels to digital pixel values.

According to another aspect of the present invention, there is provided a computer-readable recording medium for storing at least a computer program controlling an image rendering apparatus, the computer program converting pixel values of each of input pixels included in an input image with a desired resolution to tristimulus values; obtaining tristimulus values of each of output pixels with a predetermined area in an output image; and converting the tristimulus values of each of output pixels to digital pixel values.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
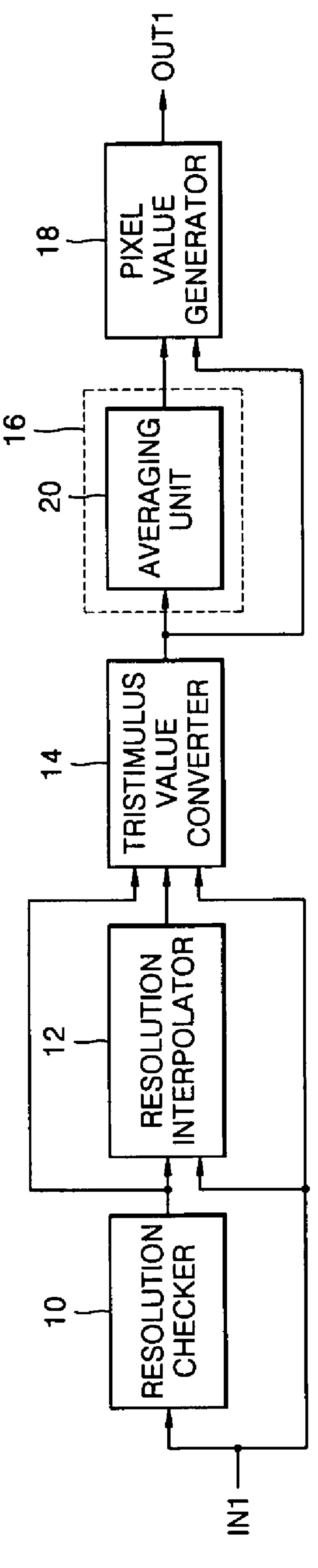
FIG. 1 is a block diagram of an image rendering apparatus, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an embodiment of an image rendering apparatus according to an embodiment of the present invention, wherein the image rendering apparatus includes a resolution checker 10, a resolution interpolator 12, a tristimulus value converter 14, a tristimulus value generator 16, and a pixel value generator 18.

Figure 2:
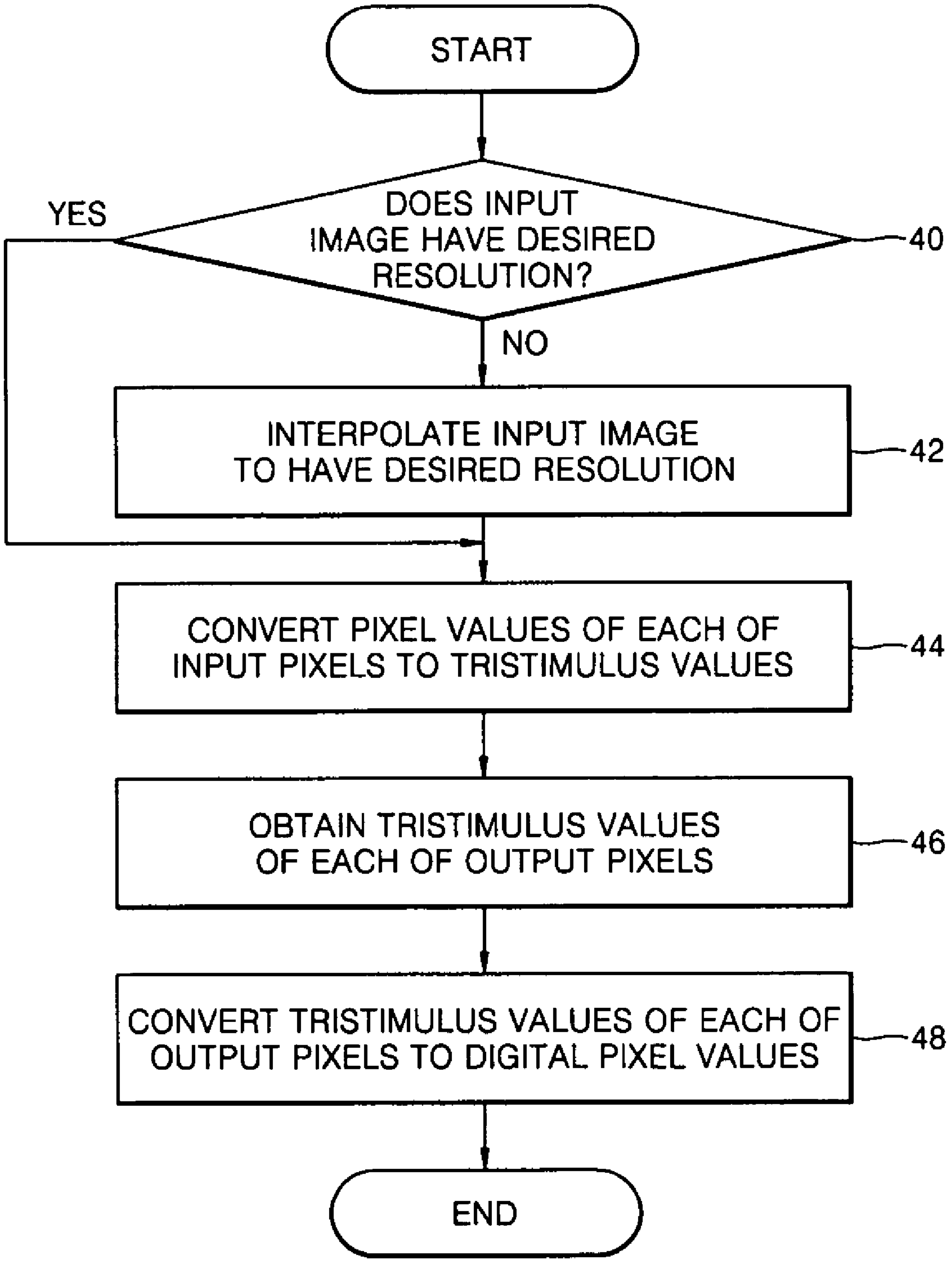
FIG. 2 is a flowchart illustrating an image rendering method, according to an embodiment of the present invention.

FIG. 2 is a flowchart illustrating an image rendering method according to an embodiment of the present invention, wherein the image rendering method includes: obtaining tristimulus values of input pixels included in an input image with a desired resolution or in an interpolated input image (operation 40 through 44); obtaining tristimulus values of output pixels included in an output image (operation 46); and converting the obtained tristimulus values to digital pixel values (operation 48).

The image rendering method shown in FIG. 2 can be performed by the image rendering apparatus shown in FIG. 1.

The image rendering apparatus and method shown in FIGS. 1 and 2 render an input image suitable to the properties of an output display unit (not shown) as follows. Here, a rendered result of the input image is an output image and the output image is displayed by an output display unit.

According to an embodiment of the present invention, the resolution checker 10 shown in FIG. 1 checks whether an input image received through an input terminal IN1 has a desired resolution and outputs the checked result to the resolution interpolator 12 and the tristimulus value converter 14, respectively (operation 40). Here, the input image received through the input terminal IN1 is an image suitable for a display unit having a three-stripe pixel configuration.

Figure 3:
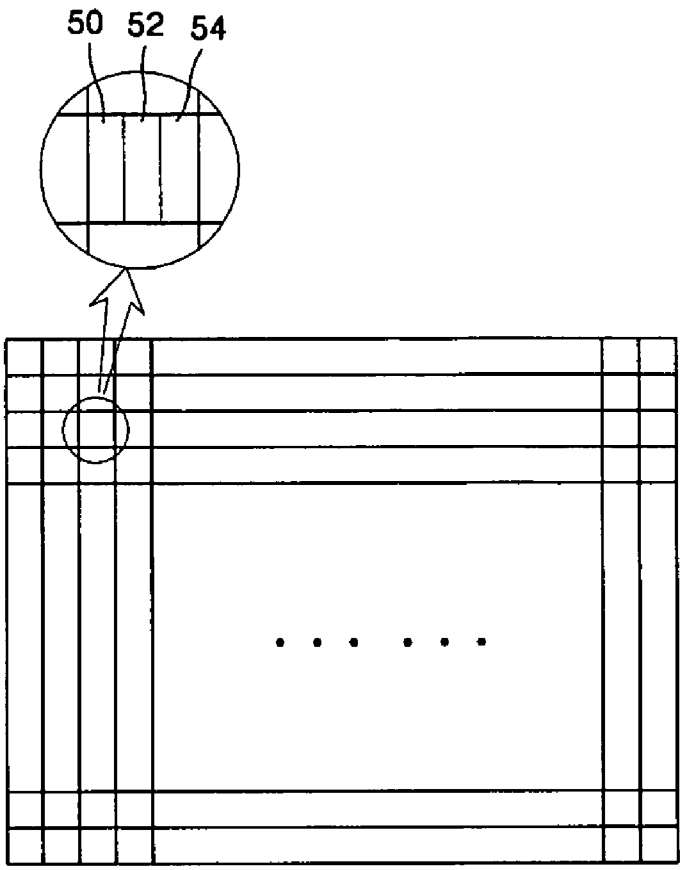
FIG. 3 illustrates a display unit with a three-stripe pixel configuration.

FIG. 3 illustrates an exemplary view of the display unit with the three-stripe pixel configuration, wherein the display unit consists of a plurality of input pixels each with a rectangular form and each input pixel consists of three subpixels 50, 52, and 54 with the three-stripe configuration.

The three-stripe configuration, for example, as shown in FIG. 3, represents a configuration in which each input pixel consists of three subpixels 50, 52, and 54 representing Red (R), Green (G), and Blue (B), respectively.

At this time, the resolution interpolator 12 interpolates the input image received through the input terminal IN1 to have a desired resolution in response to the result checked by the resolution checker 10, and outputs the interpolated input image to the tristimulus value converter 14 (operation 42). For example, if the checked result received from the resolution checker 10 indicates that the input image does not have the desired resolution, the resolution interpolator 12 interpolates the input image to have the desired resolution. For that, the resolution interpolator 12 can expand the input image so that the input image has the desired resolution.

After operation 42, the tristimulus value converter 14 converts pixel values of input pixels included in an interpolated input image received from the resolution interpolator 12 or in a non-interpolated input image received through the input terminal IN1 to tristimulus values, in response to the checked result received from the resolution checker 12, and outputs the tristimulus values of each of the input pixels to the tristimulus value generator 16 and the pixel value generator 18, respectively (operation 44). Here, the tristimulus value is a value representing a X, Y, or Z component in the XYZ color space, wherein the Y component is a luminance component and the pixel values of the input pixels can be digital RGB values of Red (R), Green (G), and Blue (B). For example, if the pixel values of the input pixels are digital RGB values, the tristimulus value converter 14 converts the digital RGB values of each input pixel to tristimulus values of X, Y, and Z components.

For example, if the checked result received from the resolution checker 10 indicates that the input image has the desired resolution, the tristimulus value converter 14 receives the input image with the desired resolution through the input terminal IN1, and if the checked result indicates that the input image does not have the desired resolution, the tristimulus value converter 14 receives the interpolated input image from the resolution interpolator 12. At this time, the tristimulus value converter 14 converts the pixel values of each input pixel included in the input image to the tristimulus values using a color profile of the input image. If the color profile of the input image is not available, the tristimulus value converter 14 can calculate the tristimulus values of the pixel values, assuming that the input image is an RGB image. According to another embodiment of the present invention, if an input image with a desired resolution is received through the input terminal IN1, it is possible that the image rendering apparatus shown in FIG. 1 does not include the resolution checker 10 and the resolution interpolator 12. Accordingly, it is possible that the image rendering method shown in FIG. 2 does not include operations 40 and 42. In this case, the tristimulus value converter 14 receives the input image with the desired resolution through the input terminal IN1 and converts pixel values of each of the input pixels included in the input image to tristimulus values (operation 44).

After operation 44, the tristimulus value generator 16 receives the tristimulus values of each of the input pixels from the tristimulus value converter 14, generates tristimulus values of each of the output pixels using the received tristimulus values of each input pixel, and outputs the generated tristimulus values of each of the output pixels to the pixel value generator 18 (operation 46). Here, each of the output pixels occupies a predetermined area on an output image and can include a plurality of predetermined input pixels.

According to an embodiment of the present invention, the tristimulus value generator 16 shown in FIG. 1 can be implemented by an averaging unit 20. Here, the averaging unit 20 receives tristimulus values of the input pixels from the tristimulus value converter 14, averages the received tristimulus values, and outputs the averaged result as a tristimulus value of each of the output pixels to the pixel value generator 18. That is, the averaging unit 20 calculates the tristimulus values of the respective output pixels using Equation 1.

$$X_{pixel} = \frac{\sum_{m \in A} X_m}{M} \qquad (1)$$

$$Y_{pixel} = \frac{\sum_{m \in A} Y_m}{M}$$

$$Z_{pixel} = \frac{\sum_{m \in A} Z_m}{M}$$

Here, $X_{pixel}$, $Y_{pixel}$, and $Z_{pixel}$ are X, Y, and Z components in the XYZ color space, respectively, and represent the tristimulus values of the output pixel, A is an area occupied by the output pixel, M is the number of input pixels included in the area A of the output pixel, $X_m$ is a tristimulus value representing a X component of tristimulus values of a m-th input pixel ($1 \leqq m \leqq M$) among the M input pixels included in the area A, $Y_m$ is a tristimulus value representing a Y component of the tristimulus values of the m-th input pixel among the M input pixels included in the area A, and $Z_m$ is a tristimulus value representing a Z component of the tristimulus values of the m-th input pixel among the M input pixels included in the area A.

According to an embodiment of the present invention, after operation 46, the pixel value generator 18 converts the tristimulus values of each output pixel received from the tristimulus value generator 16 to digital pixel values and outputs the converted digital pixel values through an output terminal OUT1 (operation 48).

In the image rendering method according to an embodiment of the present invention as described above, digital pixel values of each output pixel are obtained regardless of the number or configuration of subpixels included in an output image. However, if two or more subpixels among subpixels included in each output image represent the same color component, the digital pixel values of each output pixel can be obtained by adjusting luminance components of the subpixels representing the same color component, as follows.

Figure 4:
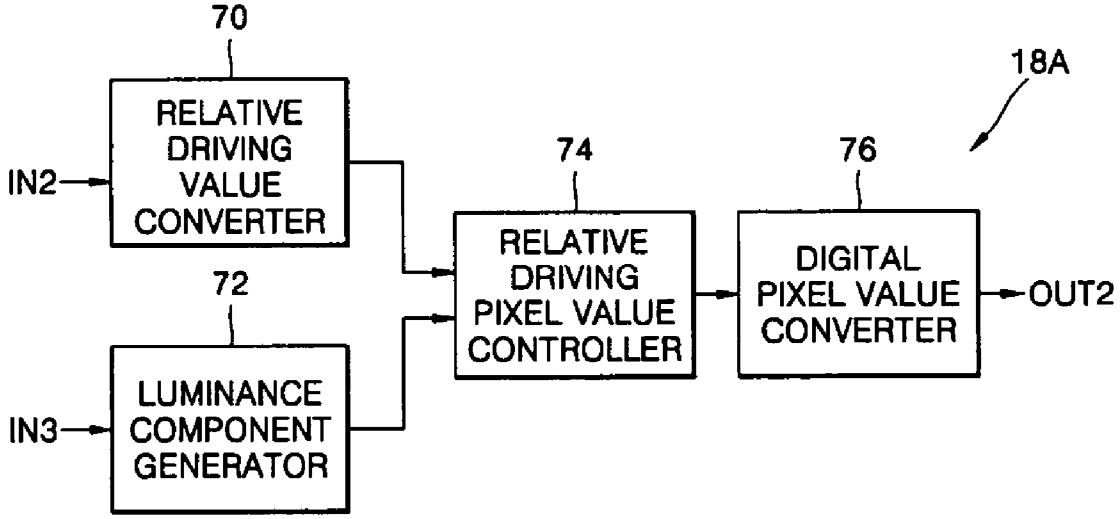
FIG. 4 is a block diagram of a pixel value generator shown in FIG. 1, according to an embodiment of the present invention.

FIG. 4 is a block diagram of the pixel value generator 18 shown in FIG. 1, according to an embodiment 18A of the present invention, wherein the pixel value generator 18A includes a relative driving value converter 70, a luminance component generator 72, a relative driving value controller 74, and a digital pixel value converter 76.

Figure 5:
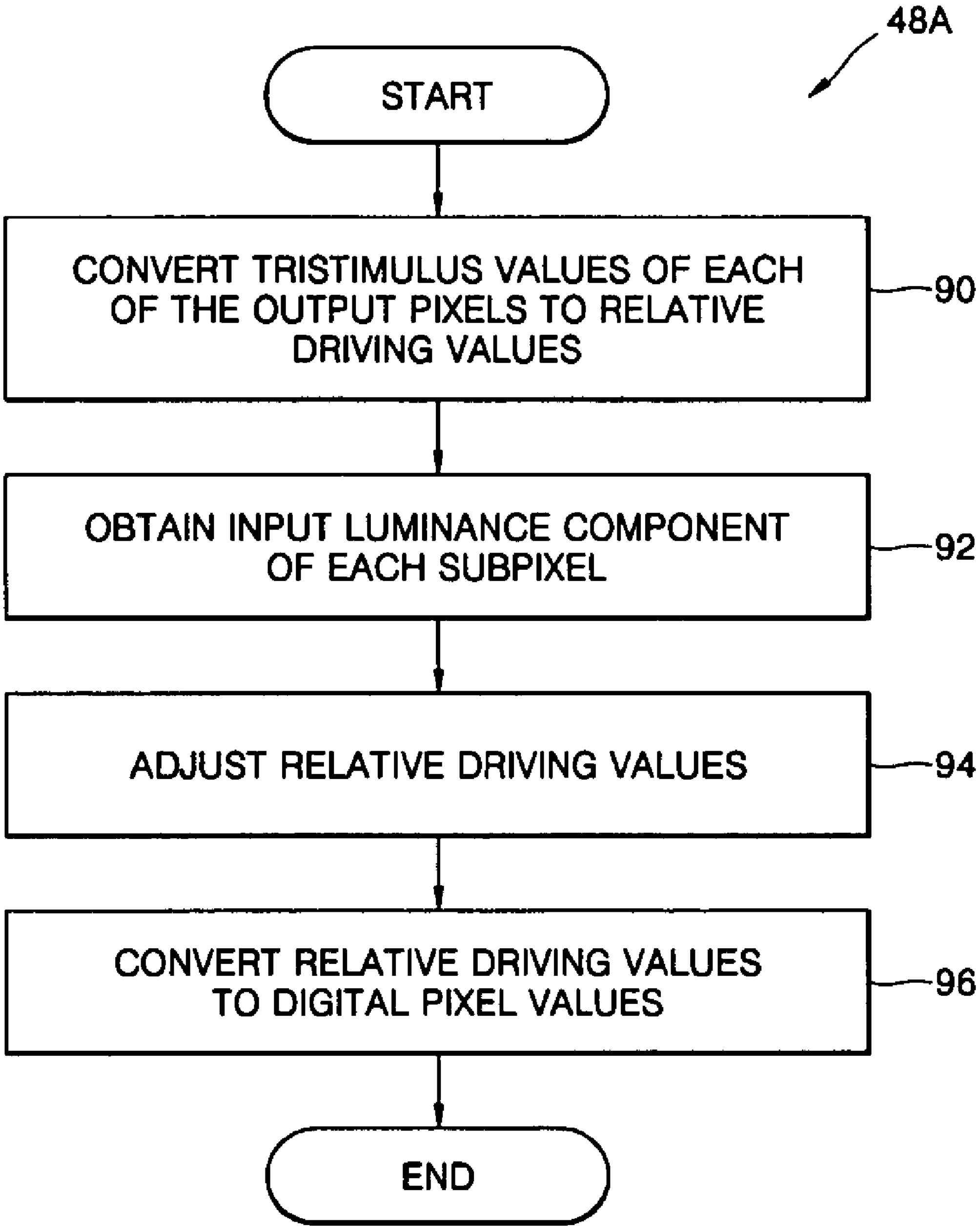
FIG. 5 is a flowchart illustrating operation 48 shown in FIG. 2, according to an embodiment of the present invention.

FIG. 5 is a flowchart illustrating operation 48A shown in FIG. 2, according to an embodiment 48A of the present invention, wherein the operation 48 includes: obtaining relative driving values (operation 90), obtaining input luminance components (operation 92), adjusting the relative driving values (operation 94), and converting the relative driving values to digital pixel values (operation 96).

The operation 48A shown in FIG. 5 can be performed by the pixel value generator 18A shown in FIG. 4.

In the image rendering apparatus and method shown in FIGS. 4 and 5, it is assumed that the output pixels do not overlap and each of the output pixels has at least two subpixels representing the same color component. Hereinafter, subpixels representing the same color component are referred to as "same color component subpixels."

Figure 6:
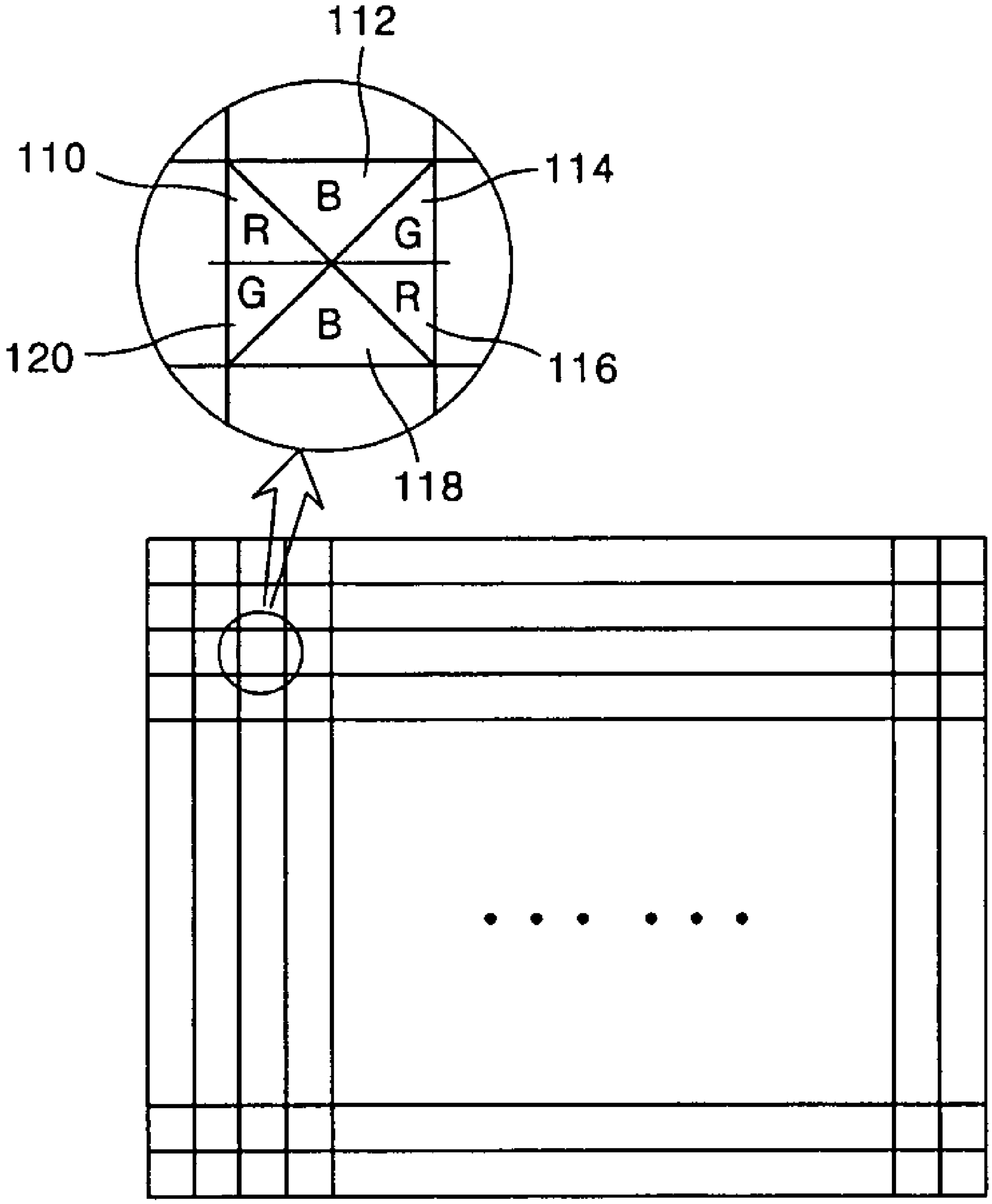
FIG. 6 shows an example of an output image.

FIG. 6 shows an example of the output image, wherein the output image consists of output pixels of a square shape, each output pixel consists of 6 subpixels 110, 112, 114, 116, 118, and 120, and each subpixel has a triangle form.

For example, referring to FIG. 6, if each of the subpixels included in each output pixel can represent one of the color components R, G, and B, each output pixel can have two of the same color component subpixels 110 and 116 representing R, two of the same color component subpixels 114 and 120 representing G, and two of the same color component subpixels 112 and 118 representing B. Here, the numbers of the same color component subpixels representing the different color components can change. For example, the number of the same color component subpixels representing R, the number of the same color component subpixels representing G, and the number of the same color component subpixels representing B are the same, in this case, "2," as shown in FIG. 6. However, the numbers can be different from each other.

According to another embodiment of the present invention, after operation 46, the relative driving value converter 70 converts the tristimulus values of each output pixel received through the input terminal IN2 from the tristimulus value generator 16 to relative driving values, and outputs the relative driving values of each output pixel to the relative driving value controller 74 (operation 90). Here, the relative driving value of each output pixel, which is also called a monitor tristimulus value, has a value between 0 and 1 and is a ratio of a present luminance value to a maximum luminance value of the output pixel.

After operation 90, the luminance component generator 72 receives from the tristimulus value converter 14 luminance components of Y among the tristimulus values of the input pixels belonging to each of the subpixels included in each the output pixel through the input terminal IN3, averages the received luminance components of Y, and outputs the averaged value as an input luminance component of the corresponding subpixel to the relative driving value controller 74 (operation 92). That is the luminance component generator 72 averages the luminance components of Y among the tristimulus values of the input pixels belonging to each of the subpixels and outputs an input luminance component of the corresponding subpixel.

After operation 92, the relative driving value controller 74 adjusts the relative driving values of the same color component subpixels until a distribution between the relative driving values of the same color component subpixels among subpixels belonging to each output pixel approximates a distribution between the input luminance components of the same color component subpixels, and outputs the adjusted results to the digital pixel value converter 76 (operation 94). For that, the relative driving value controller 74 receives the relative driving values of the same color component subpixels from the relative driving value converter 70 and the input luminance components of the same color component pixels from the luminance color generator 72.

Accordingly, the relative driving value controller 74 can adjust only the luminance components of the relative driving values of the same color component subpixels included in each output pixel without changing the entire chromaticity and luminance of each output pixel.

According to an embodiment of the present invention, after operation 92, the relative driving value controller 74 adjusts the luminance components of the relative driving values of the same color component subpixels so that a difference between the luminance components of the relative driving values of the same color component subpixels included in each output pixel approximates a difference between the input luminance components of the same color component subpixels (operation 94). This process can be expressed by an $N_{th}$ rank linear equation of Equation 2.

$$c_P\cdot(P'_N-P'_{N-1})=Y_{sub,P,N}-Y_{sub,P,N-1}$$

$$c_P\cdot(P'_n-P'_{n-1})=Y_{sub,P,n}-Y_{sub,P,n-1}$$

$$c_P\cdot(P'_2-P'_1)=Y_{sub,P,2}-Y_{sub,P,1} \quad (2)$$

Here, $c_p$ is a luminance multiple constant for a channel P, the $c_p$ changes according to the channel P, and P is one of color components (for example, R, G, or B if the subpixel represents R, G, or B). Also, N is the number of the same color component subpixels representing the color component P wherein N is greater than or equal to 2 ($2\leqq n\leqq N$). Also, $P'_n$ is an adjusted relative driving value of an n-th same color component subpixel of the N same color component subpixels and has a maximum value (for example, "1") and a minimum value (for example, "0"). For example, if N=2, P=R, and respective output pixels are implemented as shown in FIG. 6, $R'_1$ represents an adjusted relative driving value of a same color component subpixel 110 or 116 existing at a first location and $R'_2$ represents an adjusted relative driving value of a same color component subpixel 116 or 110 existing at a second location. Here, $Y_{sub,P,n}$ is an input luminance component of a same color component subpixel which exists at an n-th location of the N subpixels and represents a color component of P. Also, $c_P P_n'$ is a luminance component of an adjusted relative driving value of the n-th same color component subpixel.

Since an output pixel seldom has subpixels more than 9, if N is smaller than 4, the adjusted relative driving value $P'_n$ expressed by Equation 2 can be easily obtained by Equation 2.

When the relative driving value controller 74 adjusts the relative driving values of the same color component subpixels as shown in Equation 2, the average chromaticity and luminance of an output pixel including the same color component subpixels do not change as seen in Equation 3. That is, the entire chromaticity of each output pixel is equal to the average chromaticity of an area corresponding to the output pixel in an input image and the entire luminance of each output pixel is equal to the average luminance of an area corresponding to the output pixel in the input image. For example, referring to FIG. 6, a chromaticity component of an output pixel including subpixels 110 through 120 is an average chromaticity component of input pixels included in the subpixels 110 through 120.

$$\frac{\sum_{n=1}^{N} P'_n}{N} = \frac{\sum_{n=1}^{N} P_n}{N} \tag{3}$$

Here, $P_n$ is a non-adjusted relative driving value of the same color component subpixel existing at the n-th location.

Here, when the relative driving value controller 74 adjusts the luminance components of the relative driving values of a plurality of same color component subpixels, if the relative driving value controller 74 increases the luminance component of the relative driving value of a same color component subpixel, the relative driving value controller 74 decreases the luminance component of the relative driving value of a different same color component subpixel by the increased magnitude of the luminance component. For example, if each output pixel is configured as shown in FIG. 6, the relative driving value controller 74 increases the luminance component of one (110 or 116), (114 or 120), or (112 or 118) of a pair of the same color component subpixels (110 and 116), (114 and 120), or (112 and 118), and decreases the luminance component of the other (116 or 110), (120 or 114), or (118 or 112) of the pair of the same color component subpixels by the increased magnitude of the luminance component.

For example, if N=2, Equation 2 can be rewritten as Equation 4, wherein a relative driving value $P_1$ of a same color component subpixel existing at a first location (n=1) and a relative driving value $P_2$ of a same color component subpixel existing at a second location (n=2) can be adjusted by Equation 5.

$$c_P(P'_1-P'_2)=Y_{sub,P,1}-Y_{sub,P,2} \tag{4}$$

$$P'_1=P_1+DP$$

$$P'_2==P_2-DP \tag{5}$$

Here, DP can be obtained by Equation 6.

$$DP = \frac{(Y_{sub,P,1} - Y_{sub,P,2})}{2c_P} \tag{6}$$

Referring to Equation 5, to prevent the entire chromaticity and luminance of an output pixel from changing, DP is subtracted from $P_2$ as the DP is added to $P_1$. At this time, the DP is decided based on a difference between an input luminance component $Y_{sub,P,1}$ of the same color component subpixel at the first location (n=1) and an input luminance component $Y_{sub,P,2}$ of the same color component subpixel at the second location (n=2), as seen in Equation 6. Accordingly, the difference between the luminance components of the relative driving values of the same color component subpixels in each output pixel can approximate a difference between the input luminance components of the same color component subpixels.

For example, if each output pixel is implemented as shown in FIG. 6, when P is equal to R, to adjust the relative driving values $R_1$ and $R_2$ of the same color component subpixels 110 and 116 representing the color component R, the input luminance components $Y_{sub,R,1}$ and $Y_{sub,R,2}$ each being an average value of the tristimulus values for the luminance component Y, among the tristimulus values of the input pixels belonging to the subpixels 110 and 116, are used. That is, the difference between the luminance components of the relative driving values $R_1$ and $R_2$ of the subpixels 110 and 116 approximates the difference between the input luminance components $Y_{sub,R,1}$ and $Y_{sub,R,2}$ of the subpixels 110 and 116.

According to another embodiment of the present invention, after operation 92, the relative driving value controller 74 adjusts the relative driving values of the same color component subpixels until a ratio between the relative driving values of the same color component subpixels among the subpixels belonging to each output pixel approximates a ratio between the input luminance components of the same color component subpixels (operation 94). This process can be expressed by Equation 7.

$$P'_n = P_a \cdot \frac{Y_{sub,p,n}}{Y_p} \tag{7}$$

Here, $Y_P$ is an average value of the input luminance components decided in operation 92 for the N same color component subpixels representing the color component P and is expressed by Equation 8, and $P_a$ is an average value of non-adjusted relative driving values $P_n$ of the N same color component subpixels representing the color component P and is expressed by Equation 9.

$$Y_P = \frac{\sum_{n=1}^{N} Y_{sub,P,n}}{N} \tag{8}$$

$$P_a = \frac{\sum_{n=1}^{N} P_n}{N} \tag{9}$$

According to an embodiment of the present invention, the relative driving value controller 74 can use an adjusted relative driving value as a maximum value if the adjusted relative driving value exceeds a maximum value, and use an adjusted relative driving value as a minimum value if the adjusted relative driving value is smaller than a minimum value. For example, if the maximum and minimum values are "1" and "0", respectively, the relative driving value controller 74 sets $P'_i$=0 if $P'_i$ is smaller than 0 and sets $P'_i$=1 if $P'_i$ is greater than 1.

Meanwhile, after operation 94, the digital pixel value converter 76 converts adjusted or non-adjusted relative driving values of each output pixel received from the relative driving value controller 74 to digital pixel values, and outputs the digital pixel values through an output terminal OUT2 (operation 96).

The digital pixel values described above in operations 48 or 96 are obtained for each channel, and the input image has, for example, a range of 0 through $2^R-1$.

Hereinafter, a computer-readable recording medium storing a computer program controlling the image rendering apparatus, according to an embodiment of the present invention, is described as follows.

The computer-readable recording medium storing at least a computer program controlling the image rendering apparatus, according to an embodiment of the present invention, can store a computer program performing: converting pixel values of each of input pixels included in an input image with a desired resolution to tristimulus values, obtaining tristimulus values of each of the output pixels with a predetermined area of an output image, and converting the tristimulus values of each of the output pixels to digital pixel values. Here, the computer program stored in the recording medium further includes: determining whether the input image has the desired resolution; if it is determined that the input image does not have the desired resolution, interpolating the input image to have the desired resolution; and if it is determined that the input image has the desired resolution or after interpolating the input image, converting pixel values of each of the input pixels included in the input image with the desired resolution or in the interpolated input image to tristimulus values.

Here, the operation for obtaining the tristimulus values of each of the output pixels is performed by obtaining an average value of tristimulus values of the input pixels belonging to each of the output pixels and uses the obtained average value as a tristimulus value of each of the output pixels.

Also, the operation for converting the tristimulus values of the output pixels to the digital pixel values includes: converting pixel values of each of the input pixels included in an input image with a desired resolution to tristimulus values; obtaining tristimulus values of each of the output pixels with a predetermined area of an output image; and converting the tristimulus values of each of the output pixels to digital pixel values.

As described above, the image rendering apparatus and method and the computer-readable recording medium for storing the computer program controlling the apparatus, according to an embodiment of the present invention, can render an image regardless of geographical forms of subpixels of each output pixel, that is, even though each output pixel consists of subpixels with a geometrical pattern, and can apply a subpixel rendering algorithm while calculating digital pixel values for each output pixel, differently from the conventional rendering method which can be applied only to subpixels of specific shape, thereby preventing color fringe errors or visual artifacts without separate filtering. In particular, by rendering subpixels using only luminance information, considering that a human's spatial resolution ability is more sensible to luminance than to chromaticity, it is possible to simply render an image at a higher speed and to be easily implemented compared to the conventional rendering method.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image rendering apparatus comprising:

a tristimulus value converter converting pixel values of each of input pixels included in an input image with a desired resolution to converted tristimulus values and outputting the converted tristimulus values of the input pixels;

a tristimulus value generator generating generated tristimulus values of each of output pixels with a predetermined area of an output image, using the converted tristimulus values of each of the input pixels received from the tristimulus value converter, and outputting the generated tristimulus values of the output pixels; and a pixel value generator converting the generated tristimulus values of each of the output pixels received from the tristimulus value generator to digital pixel values and outputting the converted digital pixel values.

2. The image rendering apparatus of claim 1, further comprising:

a resolution checker checking whether the input image has the desired resolution; and a resolution interpolator interpolating the input image to have the desired resolution in response to a checked result received from the resolution checker, wherein the tristimulus value converter converts the pixel values of each of the input pixels included in an interpolated input image or in a non-interpolated input image to the converted tristimulus values, in response to the checked result received from the resolution checker.

3. The image rendering apparatus of claim 1, wherein the tristimulus value generator includes an averaging unit to receive the converted tristimulus values of the input pixels belonging to each of the output pixels from the tristimulus value converter, average the received converted tristimulus values, and output the averaged value as the generated tristimulus value of each of the output pixels.

4. The image rendering apparatus of claim 1, wherein the pixel value generator comprises:

a relative driving value converter converting the generated tristimulus values of each of the output pixels received from the tristimulus value generator to relative driving values;

a luminance component generator receiving luminance components of the converted tristimulus values of the input pixels belonging to each of subpixels included in each of the output pixels from the tristimulus value converter, averaging the received luminance components, and outputting the averaged value as an input luminance component of each of the subpixels;

a relative driving value controller adjusting the relative driving values of the subpixels until a distribution between relative driving values of subpixels representing a same color component among the subpixels belonging to each of the output pixels, and the relative driving values received from the relative driving value converter, approximates a distribution between input luminance components of the subpixels received from the luminance component generator; and a digital pixel value converter converting the relative driving values of each of the output pixels to the digital pixel values, wherein the output pixels do not overlap and each of the output pixels has at least two subpixels representing the same color component.

5. The image rendering apparatus of claim 4, wherein the relative driving value controller adjusts only the luminance components of the relative driving values of the same color component subpixels included in each output pixel without changing an entire chromaticity and luminance of each output pixel.

6. The image rendering apparatus of claim 4, wherein when the relative driving value controller adjusts the luminance components of the relative driving values of a plurality of the same color component subpixels, if the relative driving value controller increases the luminance component of the relative driving value of the same color component subpixels, the relative driving value controller decreases the luminance component of the relative driving value of a different color component subpixels by an increased magnitude of the luminance component of the relative driving value of the same color component subpixels.

7. The image rendering apparatus of claim 4, wherein the relative driving value controller adjusts the relative driving values of the same color component subpixels until a ratio between the relative driving values of the same color component subpixels among the subpixels belonging to each output pixel approximates a ratio between the input luminance components of the same color component subpixels.

8. An image rendering method comprising:

converting pixel values of input pixels included in an input image with a desired resolution to converted tristimulus values;

generating generated tristimulus values of each of output pixels with a predetermined area of an output image; and converting the generated tristimulus values of the output pixels to digital pixel values.

9. The image rendering method of claim 8, further comprising:

determining whether the input image has the desired resolution; and if determined that the input image does not have the desired resolution, interpolating the input image to have the desired resolution; and if determined that the input image has the desired resolution or after interpolating the input image, converting pixel values of each input pixel included in the input image with the desired resolution or in the interpolated input image to the converted tristimulus values.

10. The image rendering method of claim 8, wherein the generating of the generated tristimulus values of each of the output pixels comprises:

obtaining average values of the converted tristimulus values of the input pixels belonging to each of the output pixels and using the obtained average values as the generated tristimulus values of each of the output pixels.

11. The image rendering method of claim 8, wherein the converting of the generated tristimulus values of each of the output pixels to the digital pixel values comprises:

converting the generated tristimulus values of each of the output pixels to relative driving values;

obtaining an average value of luminance components of converted tristimulus values of the input pixels belonging to each subpixel included in each of the output pixels, and using the obtained average value as an input luminance component of each of the subpixels;

adjusting the relative driving values of the subpixels until a distribution between the relative driving values of subpixels representing a same color component among the subpixels belonging to each of the output pixels approximates a distribution of the input luminance components of the subpixels; and converting the relative driving values of each of the output pixels to the digital pixel values, wherein the output pixels do not overlap and each of the output pixels has at least two subpixels representing the same color component.

12. The image rendering method of claim 11, wherein the adjusting of the relative driving values is performed by adjusting the relative driving values of the subpixels until a difference between luminance components of the relative driving values of the subpixels representing the same color component among the subpixels belonging to each of the output pixels approximates a difference between the input luminance components of the subpixels.

13. The image rendering method of claim 12, wherein the adjusting of the relative driving values is performed by adjusting the relative driving values of each of the output pixels using the following equations:

$$c_P\cdot(P'_N-P'_{N-1})=Y_{sub,P,N}-Y_{sub,P,N-1}$$

$$c_P\cdot(P'_n-P'_{n-1})=Y_{sub,P,n}-Y_{sub,P,n-1}$$

$$c_P\cdot(P'_2-P'_1)=Y_{sub,P,2}-Y_{sub,P,1}$$

wherein $c_p$ is a luminance multiple constant for a channel P, P is one of the color components, 2≦n≦N, N is a number of subpixels representing the color component P, $P'_n$ is the adjusted relative driving value of a subpixel at an n-th location of N subpixels, $P'_n$ having a maximum value and a minimum value, and $Y_{sub,p,n}$ is a decided input luminance component of a subpixel representing a color component P at the n-th location of the N subpixels.

14. The image rendering method of claim 13, wherein the adjusting of the relative driving values is performed by adjusting the relative driving values of each of the output pixels if N=2, using the following equation:

$$P'_1 = P_1 + \frac{(Y_{sub,P,1} - Y_{sub,P,2})}{2c_p}$$

$$P'_2 = P_2 - \frac{(Y_{sub,P,1} - Y_{sub,P,2})}{2c_p}$$

wherein $P_n$ is a non-adjusted relative driving value of the subpixel at the n-th location.

15. The image rendering method of claim 13, wherein the adjusted relative driving value exceeding the maximum value is decided as the maximum value and an adjusted relative driving value smaller than the minimum value is decided as the minimum value.

16. The image rendering method of claim 11, wherein the adjusting of the relative driving values is performed by adjusting the relative driving values of the subpixels until a ratio between the relative driving values of the subpixels representing the same color component among the subpixels belonging to each of the output pixels approximates a ratio between the input luminance components of the subpixels.

17. The image rendering method of claim 16, wherein the adjusting of the relative driving values is performed by adjusting the relative driving value of each of the output pixels using the following equation:

$$P'_n = P_a \cdot \frac{Y_{sub,p,n}}{Y_p}$$

wherein, P is one of the color components, 2≦n≦N, N is the number of subpixels representing a color component P, $P'_n$ is the adjusted relative driving value of a subpixel at a n-th location of N subpixels, $P'_n$ having a maximum value and a minimum value, and $Y_{sub,p,n}$ is a decided input luminance component of a subpixel representing a color component P at the n-th location of the N subpixels, $Y_P$ is an average value of decided luminance components for the N subpixels, and $P_a$ is an average value of non-adjusted relative driving values of the N subpixels.

18. The image rendering method of claim 17, wherein the adjusted relative driving value exceeding the maximum value is decided as the maximum value and the adjusted relative driving value smaller than the minimum value is decided as the minimum value.

19. The image rendering method of claim 11, wherein the relative driving value of each output pixel has a value between 0 and 1 and is a ratio of a present luminance value to a maximum luminance value of the output pixel.

20. The image rendering method of claim 11, wherein an entire chromaticity of each output pixel is equal to the average chromaticity of an area corresponding to the output pixel in the input image and an entire luminance of each output pixel is equal to the average luminance of an area corresponding to the output pixel in the input image.

21. The image rendering method of claim 8, wherein if two or more subpixels among the subpixels included in the output image represent a same color component, the digital pixel values of each of the output pixels is obtained by adjusting luminance components of the subpixels representing the same color component.

22. A computer-readable recording medium storing at least a computer program controlling an image rendering apparatus, the computer program performing:

converting pixel values of each of input pixels included in an input image with a desired resolution to converted tristimulus values;

obtaining generated tristimulus values of each of output pixels with a predetermined area of an output image; and converting the generated tristimulus values of each of the output pixels to digital pixel values.

23. The computer-readable recording medium of claim 22, wherein the computer program stored in the computer-readable recording medium further performs:

determining whether the input image has the desired resolution; and if determined that the input image does not have the desired resolution, interpolating the input image to have the desired resolution, wherein, if determined that the input image has the desired resolution or after interpolating the input image, converting pixel values of the input pixels included in the input image with the desired resolution or in the interpolated input image to the converted tristimulus values.

24. The computer-readable recording medium of claim 22, wherein the obtaining of the generated tristimulus values of each of the output pixels comprises:

obtaining an average value of the converted tristimulus values of the input pixels belonging to each of the output pixels and using the obtained average value as a generated tristimulus value of each of the output pixels.

25. The computer-readable recording medium of claim 22, wherein the converting of the generated tristimulus values of each of the output pixels to the digital pixel values comprises:

converting the generated tristimulus values of each of the output pixels to relative driving values;

obtaining an average value of luminance components of the converted tristimulus values of the input pixels belonging to subpixels included in each of the output pixels and using the obtained average value as an input luminance component of each of the subpixels;

adjusting the relative driving values of the subpixels until a distribution between the relative driving values of the subpixels representing the same color component among the subpixels belonging to each of the output pixels approximates a distribution between the input luminance components of the subpixels;

converting the adjusted relative driving values of the output pixels to the digital pixel values, wherein the output pixels do not overlap and each of the output pixels has at least two subpixels representing the same color component.

* * * * *